Nov. 23, 1943.  J. H. GODFREY  2,334,919
CHURN
Filed April 24, 1939  4 Sheets-Sheet 2
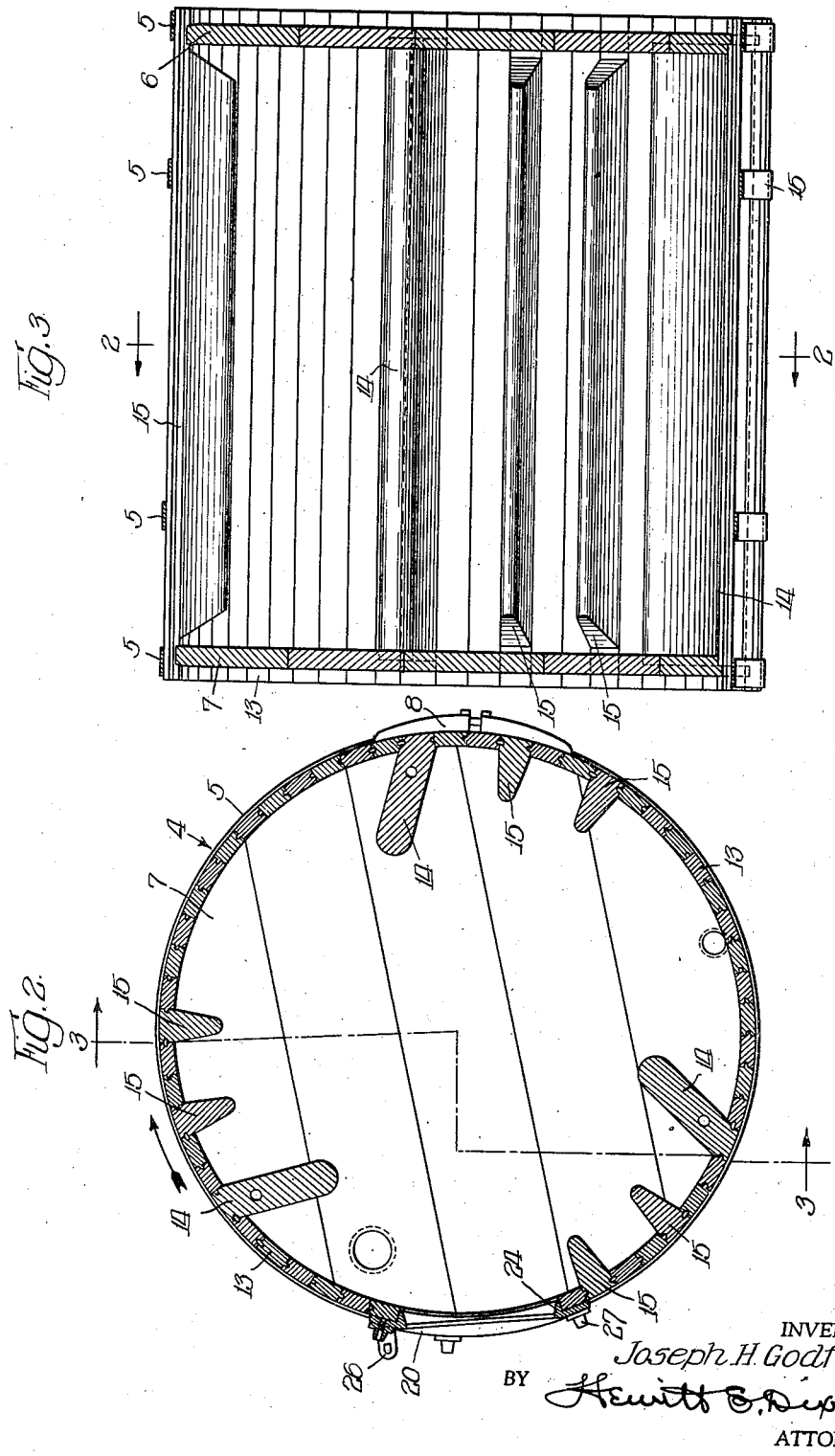
INVENTOR.
Joseph H. Godfrey,
BY
ATTORNEY.

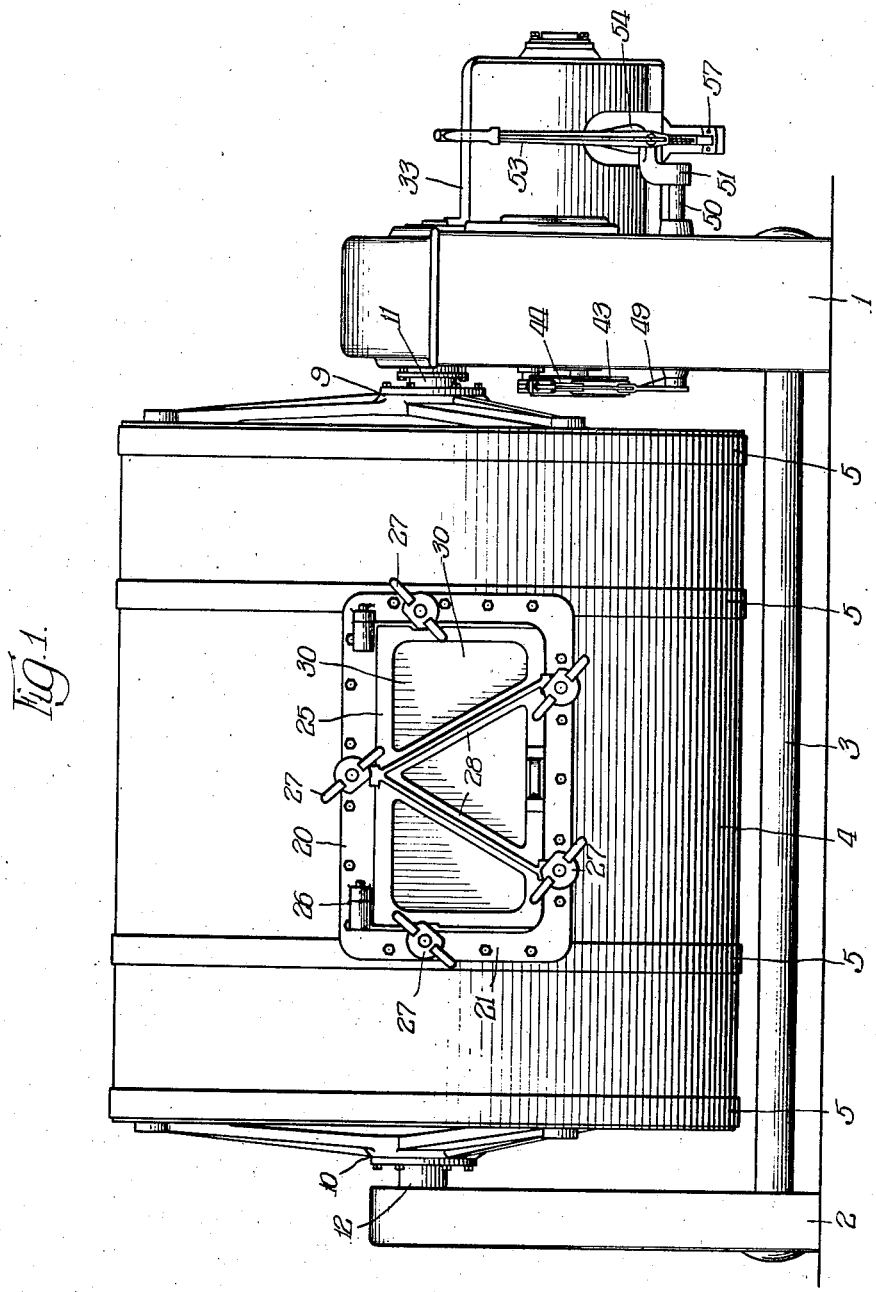

Nov. 23, 1943.　　　　J. H. GODFREY　　　　2,334,919
CHURN
Filed April 24, 1939　　　　4 Sheets-Sheet 3
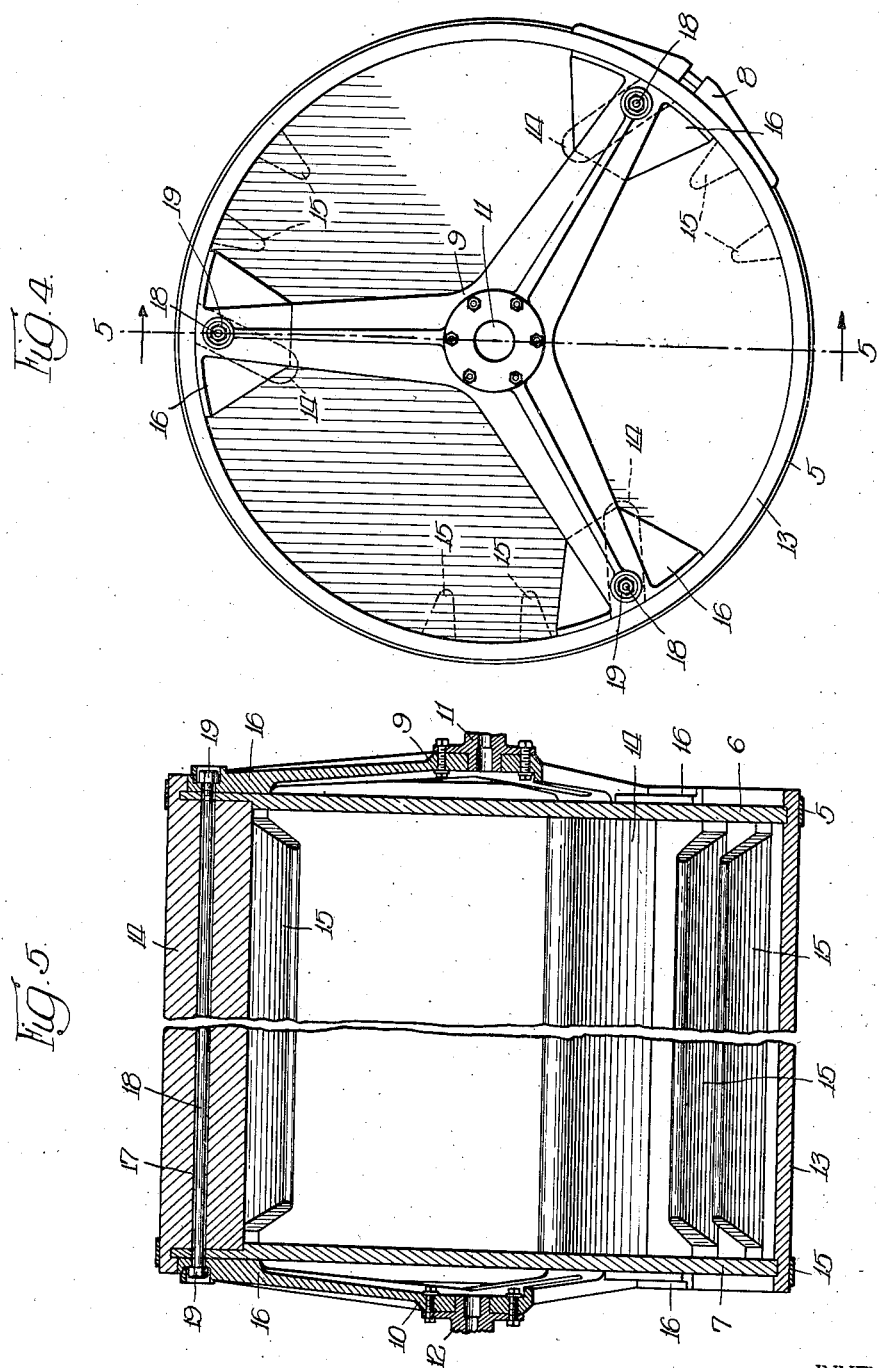
INVENTOR.
Joseph H. Godfrey,
BY
ATTORNEY.

Nov. 23, 1943.   J. H. GODFREY   2,334,919
CHURN
Filed April 24, 1939   4 Sheets-Sheet 4
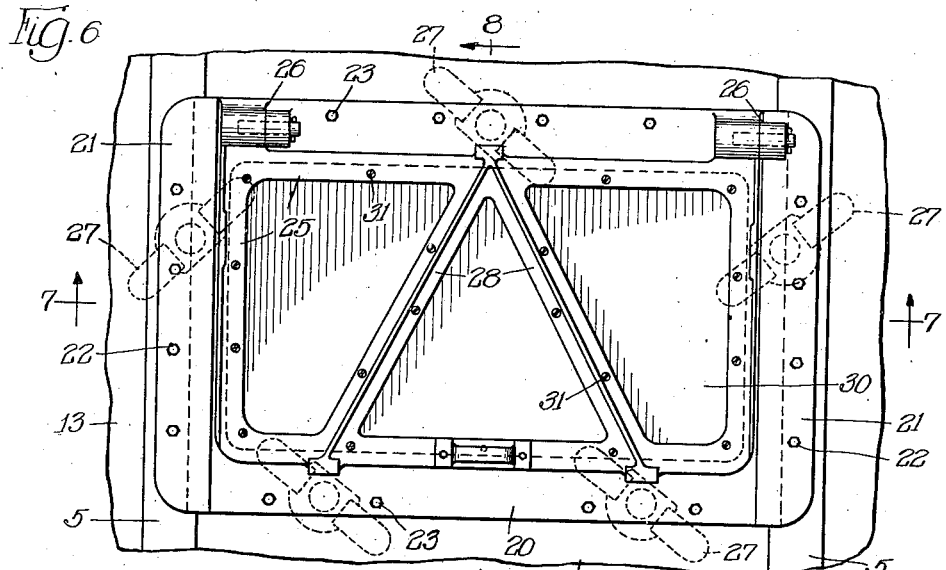
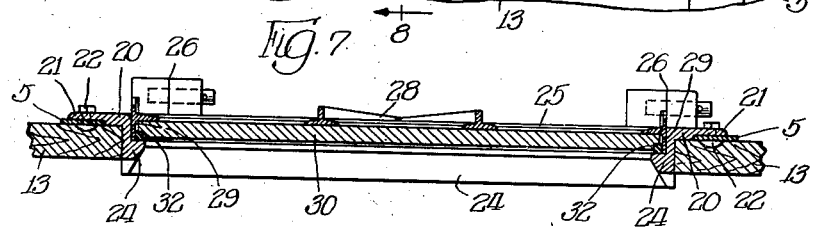
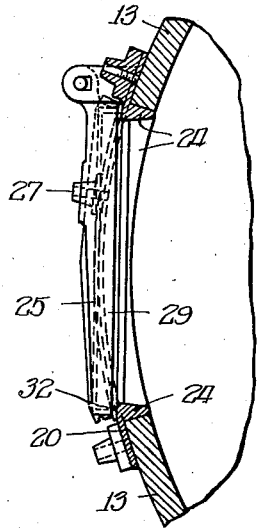
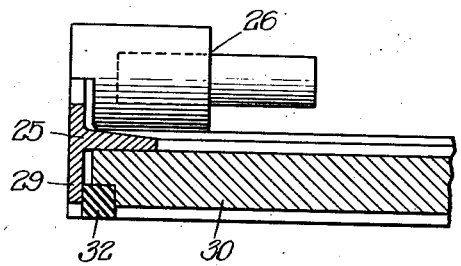
INVENTOR.
Joseph H. Godfrey,
BY
ATTORNEY.

Patented Nov. 23, 1943

2,334,919

UNITED STATES PATENT OFFICE 2,334,919

CHURN

Joseph H. Godfrey, Elmhurst, Ill., assignor to The Creamery Package Mfg. Company, Chicago, Ill., a corporation of Illinois Application April 24, 1939, Serial No. 269,587

14 Claims. (Cl. 259—81)

The invention relates to butter churns, more particularly to commercial churns of the revolving drum type in which are combined the functions of churning the cream and working the butter to produce a finished product.

The combined churn and butter worker has been used in commercial practice for many years, employing the revolving barrel for agitation of the contained cream to effect aggregation of the fat globules into granules and therefrom into a mass of butter, and employing within the barrel one or more power driven rolls operated after the butter is formed to work or intermix the mass of butter for the desired uniform characteristics of product.

More recently it has been recognized that squeezing and drawing the butter mass by power rolls causes some undesirable results in texture and other qualities of the product, and that the supporting and driving means for the rolls within the churn barrel detract from its sanitary condition. Churns have been developed lately wherein the rolls have been omitted and the working operation attempted by rolling and twisting the mass of butter over spiral or slanting shelves and drawing the butter grain by dividing and folding the mass over a central stationary bar.

My invention contemplates utilizing fully the concussion principle of butter fat separation and working as one of its objects. This is accomplished by providing circumferential sets of longitudinal shelves and kneading flutes positioned to lift the mass of butter upon a shelf, by revolution of the barrel, and to drop the mass upon the next set of kneading flutes and shelf. The consequent concussive effect attains an improved granular characteristic in the butter as distinguished from a stringy effect resulting from drawing and pulling the mass over obstructive bars or rolls. The flutes cause indentations in the fallen mass effective to knead and intermix the portions of butter with a minimum of drawing effect thus approximating the desirable kneading and mixing effect of the old fluted power roll without its undesirable drawing effect.

The provision of the circumferential working sets has a further advantage in the elimination of working rolls with their unsanitary bearings and end clearances, necessary to the operation of power-driven rolls, and inaccessible for thorough cleaning. Likewise, all roll driving mechanism is eliminated, with obvious advantage.

Another object of the invention is to provide operative support for the barrel which relieves that wooden structure, particularly the heads, of undue strains arising from the driving torque and the weight of the barrel and contents. When the end gudgeons are bolted directly to the barrel heads, as in former practice, such strains cause weaving of the head members, mis-alinement of the shafts, consequent rapid wear of the driving mechanism, and opening of the joints in the barrel structure. Furthermore, exposed bolt heads in the churn are subject to corrosion and are unsanitary. I have provided the two end gudgeons with driving and supporting arms extended to the stave ends, and have secured the pairs of opposite arms to each other by rigid tie rods enclosed in longitudinal bores provided in the shelves, thus securely clamping the barrel structure between the two end gudgeons, supporting the weight of the barrel and its contents at its most rigid portions, maintaining true alinement of the end shafts, and having no exposed metal fastenings within the drum.

Another object of the invention is to provide an improved door structure. Heretofore, the wooden doors have been outwardly secured to hinge straps or surface frames, the inner marginal surface of the wood closing upon a gasket provided in a frame mounted upon the barrel. In ordinary usage, the exposed edges of the wooden door frequently are bruised and small portions split off, consequently preventing sealed closure when the door is closed upon the gasket, and permitting leakage during operation of the churn. I have overcome this difficulty by providing a recessed frame within which the wooden door panel is attached with its edges wholly protected, and have mounted the gasket in a marginal groove in the wooden panel abutting the metal sides of the frame, the gasket extending inwardly of the inner surface of the panel for tight engagement, when closed, with the metal frame mounted upon the barrel. Thus protected, frequent renewal of the door panel is unnecessary.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the spirit and scope of the invention as expressed in the appended claims.

Referring to the drawings, Fig. 1 is a side view in elevation of the complete churn. Fig. 2 is a cross-sectional view of the churn barrel as taken on the plane of the line 2—2 in Fig. 3. Fig. 3 is a longitudinal sectional view as taken on the planes of the irregular line 3—3 in Fig. 2. Fig. 4 is an end view of the barrel illustrating the mounting of one of the end gudgeons. Fig. 5 is a longitudinal sectional view of the barrel and end gudgeons as taken on the plane of the line 5—5 in Fig. 4 and particularly illustrating the tie-rod connections between the opposite arms of the gudgeons. Fig. 6 is a plan view of the churn door and its frame members. Fig. 7 is a longitudinal sectional view of the door and frame members as taken on the plane of the line 7—7 in Fig. 6. Fig. 8 is a cross sectional view taken on the plane of the line 8—8 in Fig. 6. Fig. 9 is a sectional detail illustrating the arrangement of the gasket.

In the drawings (Fig. 1) the reference numeral 1 indicates a combined standard and gear case, and spaced therefrom is a rear standard 2, the two standards being rigidly interconnected by frame rails 3. Positioned between the standards 1 and 2 is a cylindrical churn barrel 4 of wood stave construction secured by circumferential hoops 5 and having its ends closed by heads 6 and 7, also of wood. The hoops are adjustable for tension by turn-buckle joints 8.

The barrel 4 is endwardly supported by a front gudgeon 9 and a rear gudgeon 10, attached to the barrel as hereinafter more specifically described. The front gudgeon 9 carries a journal and drive shaft 11 supported in a suitable bearing provided in the gear case 1 and having driven connection with a conventional train of speed reduction gears (not shown) housed within the case 1. The rear gudgeon 10 carries a journal 12 supported in a conventional bearing provided in the rear standard 2. The journals 11 and 12 are in coincident axial relation to the barrel 4 and support the latter in its rotary operation in performance of the butter churning and working functions.

The cylindrical wall of the barrel 4 is constructed of wood staves 13 (Figs. 2 and 3) preferably joined in tongue-and-groove relation. The wood heads 6 and 7 are mortised into the respective end portions of the staves and the assembly secured by the overlying hoops 5. Spaced about the circumference of the barrel at equal intervals is a series of three longitudinal shelves 14 having their outer marginal portions shaped similarly to and displacing the staves at the respective points of juncture between the shelves and the barrel wall. The shelves 14 are thus integral with the wall structure, providing greatly added strength of support for the shelves and avoiding any other joints or securing means between the shelves and the churn wall which might open or fail under the strains of operation of the churn. For further strength, the ends of the shelves are mortised into the heads 6 and 7. The shelves 14 extend inwardly of the barrel space at a rearward angle of some twenty degrees from radial direction, so that with the rotation of the churn (as indicated by arrow) the mass of butter being lifted on one shelf will fall therefrom by gravity at the right time to drop the mass just in front of the next shelf.

Positioned in front of each of the shelves 14 are a spaced pair of kneading flutes 15, also having their outer marginal portions shaped like a stave and incorporated into the wall structure for their only and rigid support. The flutes 15 extend radially inward and are formed with a wedge-like cross-section. The end portions of the flutes preferably are cut back angularly from the barrel heads to simplify the construction. The flutes function to penetrate and deform the mass of butter as it falls before each of the shelves, thus effecting the kneading and intermixing of the mass. The three sets of shelves and flutes accomplish rapid working of the butter by lifting and dropping the mass three times during each revolution of the churn barrel. The several sets of shelves and flutes together serve to agitate the cream in the first stage of churning to aggregate the butter fat.

The barrel supporting gudgeons 9 and 10 are constructed with their hub portions preferably spaced from the barrel heads, and each is provided with three radial arms (Figs. 4 and 5) extending endwardly outward of the respective shelves 14. The terminal portions of the arms are provided with integral pads 16 contacting the marginal portions of the respective heads 6 and 7 and also the adjacent ends of the stave structure. Each shelf 14 has a longitudinal bore 17 through its center portion, within which is positioned a tie-rod 18 extending endwardly through the heads 6 and 7 and through the overlying arms of the gudgeons 9 and 10. The threaded ends of the tie-rods carry nuts 19 by which the gudgeon arms and terminal pads are drawn tightly against the underlying heads and the latter clamped tightly to the ends of the heavy shelves closely adjacent to the cylindrical wall of the barrel. This rigid assembly of the two gudgeons, with the connecting tie-rods fixing their inter-relation, assures constant alinement of the gudgeon journals, and the bearing of the rim portions of the arm pads against the stave ends maintains the journals coincident with the axis of the barrel. The construction prevents weaving and distortion in operation of the barrel and its supports caused by the weight and concussion of its contents and the normal swelling of the wood. It will be observed that no metallic fastenings are exposed to the interior of the churn.

Access to the interior of the churn is had through a door opening in its cylindrical wall. A wall frame 20 is mounted about the opening (Figs. 6-9) and is provided with end flanges 21 overlying the adjacent barrel hoops 5. The flanges are secured to the hoops by means of bolts 22 which do not extend through the staves, thus firmly securing the wall frame without exposing the bolt heads to the interior of the churn. The side members of the frame are held to the stave wall by wood screws 23.

A narrow ledge 24, formed on the frame, extends inwardly across the edges of the staves about the door opening to protect the stave edges from injury by the implements used in loading and unloading the churn.

A door frame 25 is mounted upon the wall frame 20, and is swingably attached thereto at one side by means of hinges 26. The door frame is secured in closed position by conventional cam locks 27 mounted on the wall frame. The door frame is reinforced by integral cross members 28. A peripheral flange 29 is provided on the frame 25, and extends partially inward of the wall frame 20 when the door is closed. A wood door panel 30 is positioned within and slightly spaced from the flange 29, and is secured to the frame members 25 and 28 by wood screws 31. The panel 30 is recessed about its edges adjacent the flange 29 to receive and support between the panel and the flange a resilient gasket 32. The gasket is positioned to abut a shoulder provided about the wall frame 20 and effect a tight seal when the door is locked shut. In this construction, the wood door panel is not subjected to any of the strain of directly attached hinges, and its edges are protected by the overextending flange 29. Also, the hinges are not distorted in position by any swelling of the wood door panel. The mounting of the gasket effects a positive seal with the wood panel and the door frame. The gasket is maintained in position by the flange 29 so that registry with its seat in the wall frame is always accurate and possibility of leakage from the door opening is reduced to the minimum.

I claim as my invention:

1. In a butter churn and worker, a rotatable barrel having a side wall and end closure walls, a plurality of structural members extending longitudinally of said barrel and abutting said end walls, a pair of gudgeons respectively mounted outwardly upon said end walls, and a plurality of tie rods enclosed respectively within said structural members and endwardly secured to each of said gudgeons.

2. In a butter churn and worker, a rotatable barrel having a peripheral side wall and end closure walls, a plurality of longitudinally extending structural members positioned within said barrel and abutting both of said end walls, a gudgeon positioned outwardly of each of said end walls, said gudgeons having a like plurality of radial arms, a bearing pad formed upon the end of each of said arms, said pads having supporting contact with said end walls respectively opposite to the abutting portions of said structural members and with the adjacent end portions of said side wall, and a plurality of tie rods enclosed by and extending through said structural members and end walls and interconnecting the oppositely positioned bearing pads of said gudgeons.

3. In a butter churn and worker, a rotatable barrel having a side wall of stave construction, said wall having an opening therethrough, a pair of stave retaining peripheral bands mounted on said wall adjacent opposite sides of said opening, a wall frame mounted on the marginal portion of said wall surrounding said opening, said frame having an inner ledge protectively covering the edges of said staves defining said opening, and a pair of flanges formed on opposite sides of said frame adjacent said bands, said flanges overlying and being secured to said bands.

4. In a butter churn and worker, a rotatable barrel having a side wall, said wall having an opening therethrough, a wall frame mounted on the marginal portion of said wall surrounding said opening, a door frame hingedly mounted on said wall frame, a door panel secured to said door frame, a peripheral flange formed on said door frame, said flange being laterally spaced from the edges of said panel, said panel having a marginal recess formed therein adjacent said flange, a resilient gasket supported in said recess between said panel and said flange, said gasket being in sealing engagement with said wall frame when said door frame is closed upon said opening, and means for releasably securing said door frame in closed position.

5. In a butter churn and worker, a cylindrical barrel having its side wall constructed of staves and having closed end walls, said barrel being supported in horizontal position for rotation about its axis, a plurality of longitudinally extending flat lifting shelves positioned within said barrel in parallel relation to its axis and spaced equally between adjacent shelves, said shelves having their base portions incorporated in said stave side wall structure and having their end portions supported upon said end walls, the lifting surface of each of said shelves being disposed at an angle rearward relatively to the direction of rotation of said barrel of a radial plane extending through its base, and a plurality of longitudinally extending kneading flutes positioned about said side wall in parallel relation to said axis, said flutes having their base portions incorporated in said side wall structure and extending radially inward therefrom with substantially less width than the width of said shelves, said flutes being disposed in pairs forwardly of said shelves respectively and in spaced relation to each other and to said shelves.

6. A churn and butterworker comprising, in combination, a rotatable drum, rotatable supports for rotatably supporting said drum, butterworking and churning shelves within said drum, and means directly supporting said shelves upon said drum supports and directly transmitting substantially all shelf supporting strains to said supports without transmitting said strains to said drum.

7. A churn and butterworker comprising, in combination, a rotatable drum, supports for rotatably supporting said drum, butterworking and churning shelves within said drum, and means directly supporting said shelves upon said drum supports, said means comprising screw means individual to and passing through at least a portion of said shelves and so constructed and arranged as to transfer shelf loading stresses directly to said drum supports.

8. A butter churn comprising, in combination, a wooden drum having oppositely disposed wooden end walls, butter agitating shelves within said drum, recesses in the inner faces of said end walls, which recesses are alined with said shelves and into which recesses the ends of said shelves extend, rotary drum and shelf supporting means adjacent the outer surface of said end walls, and means for supporting the said shelves directly upon said rotary supporting means, said means being individual to and passing through at least a portion of each of said shelves and being so constructed and arranged as to transfer shelf loading stresses directly to said drum and shelf supporting means.

9. A butter churn comprising, in combination, a wooden drum having oppositely disposed wooden end walls, butter agitating shelves within said drum, recesses in the inner faces of said end walls, which recesses are alined with said shelves and into which recesses the ends of said shelves extend, rotary drum and shelf support means adjacent the outer surface of said end wall, and screw means for supporting the said shelves directly upon said rotary support means, said screw means being individual to and passing through at least a portion of each of said shelves and said end walls and so constructed and arranged as to transfer shelf loading stresses directly to said drum and shelf support means, whereby said drum will be supported upon said shelves fixed to said drum and shelf support means.

10. A butter churn and butterworker comprising, in combination, a wooden churn drum having oppositely disposed wooden drum heads, butterworking means within said drum, recesses in the inner faces of said drum heads to receive the ends of said butterworking means, rotary supporting means adjacent the outer surface of said drum heads, and tightenable tie rod means extending lengthwise through said butterworking means, through said drum heads and fixed to said rotary supporting means to clamp said drum heads, butterworking means and said rotary supports together to form thereby a rigid churn structure.

11. A churn and butterworker comprising, in combination, a wooden churn drum having oppositely disposed wooden drum heads, shelves within said drum, recesses within the inner faces of said drum heads to receive the ends of said shelves, rotary supporting means adjacent the outer surface of said drum heads and having supporting arms provided with terminal plates to engage the outer surface of the drum heads, and rod means individual to said shelves extending lengthwise through said shelves, through said drum heads and through said terminal plates and provided at their ends with tightening nuts to engage said terminal plates whereby said drum heads are compressed between the ends of said shelves and said terminal plates when said nuts are tightened to prevent the warping of said drum heads.

12. A churn and butterworker comprising, in combination, a rotatable drum having drum heads, rotatable drum and shelf supports at each end of said drum for rotatably supporting said drum through said drum heads, a butterworking and churning shelf for working and churning butter within said drum, and rod means passing lengthwise through said shelf and directly fixed to said rotatable supports adjacent each drum head for directly supporting said shelf and said drum heads upon said rotatable supports and directly transmitting shelf loading stresses to said rotatable supports.

13. In a churn and butterworker, a rotatable wooden drum having drum heads, rotatable supports at each end of said drum for rotatably supporting said drum, butterworking and churning shelves within said drum, said shelves being mortised to said drum heads, and tightenable tie rod means individual to and passing through each of said shelves, said drum heads and said rotatable supports for supporting said drum, drum heads and shelves upon said rotatable supports being so constructed and arranged as to transfer shelf loading stresses directly to said supports and compress the drum heads and shelves between said rotatable supports.

14. A churn and butterworker comprising, in combination, a rotatable drum, rotatable supports for rotatably supporting said drum, spaced butterworking and churn shelves within said drum, and means directly supporting at least some of said shelves upon said drum supports whereby shelf-supporting strains imposed upon such shelves are directly transmitted to said drum supports.

JOSEPH H. GODFREY.